United States Patent
Engers et al.

(10) Patent No.: US 11,368,492 B1
(45) Date of Patent: Jun. 21, 2022

(54) PARAMETERIZED TRUST AND PERMISSION POLICIES BETWEEN ENTITIES FOR CLOUD RESOURCES

(71) Applicant: Amazon Technologies, Inc., Seattle, WA (US)

(72) Inventors: Ross Engers, San Francisco, CA (US); Jaco Le Roux, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 86 days.

(21) Appl. No.: 17/039,340

(22) Filed: Sep. 30, 2020

(51) Int. Cl.
*G06F 21/60* (2013.01)
*H04L 29/06* (2006.01)
*H04L 9/40* (2022.01)
*H04L 65/80* (2022.01)
*H04L 41/0893* (2022.01)

(52) U.S. Cl.
CPC .......... *H04L 63/20* (2013.01); *H04L 41/0893* (2013.01); *H04L 63/101* (2013.01); *H04L 63/102* (2013.01); *H04L 65/80* (2013.01)

(58) Field of Classification Search
None
See application file for complete search history.

(56) References Cited

U.S. PATENT DOCUMENTS

| | | | | |
|---|---|---|---|---|
| 9,762,619 | B1* | 9/2017 | Vaidya | H04L 65/1073 |
| 11,082,430 | B1* | 8/2021 | Kuo | H04L 63/20 |
| 2018/0060595 | A1* | 3/2018 | Olds | G06F 3/1238 |
| 2022/0038449 | A1* | 2/2022 | Tripp | H04L 63/0815 |

* cited by examiner

*Primary Examiner* — Natisha D Cox
(74) *Attorney, Agent, or Firm* — Nicholson De Vos Webster & Elliott LLP

(57) ABSTRACT

Techniques for parameterized trust and permission policies between entities for cloud resources are described. A method of parameterized trust and permission policies between entities for cloud resources may include receiving, by an access control service of a provider network, a request to generate a parameterized policy template, the parameterized policy template including characteristics of at least one action or at least one resource to be specified by a user, receiving a parameterized action list or a parameterized resource list from the user, validating the parameterized action list or the parameterized resource list based on the characteristics defined in the parameterized policy template, and generating a parameterized role based on the parameterized policy template and the parameterized action list or the parameterized resource list.

24 Claims, 8 Drawing Sheets

PARAMETERIZED TRUST AND PERMISSION POLICIES BETWEEN ENTITIES FOR CLOUD RESOURCES

BACKGROUND

Access control permission and trust policies allow definitions of trust between two entities. For example, a user-owned resource 'res0' and a service 'AlphaService'. The user may create a trust and permission policy that gives the AlphaService access to use the res0 resource. Similarly, some types of roles, such as Service-Linked Roles (SLRs), provide a mechanism for pre-defined trust and permission policies between two entities. For example, AlphaService may define an SLR in the customer accounts giving AlphaService permission to access the res0.

BRIEF DESCRIPTION OF DRAWINGS

Various embodiments in accordance with the present disclosure will be described with reference to the drawings, in which.

DETAILED DESCRIPTION

Figure 1:
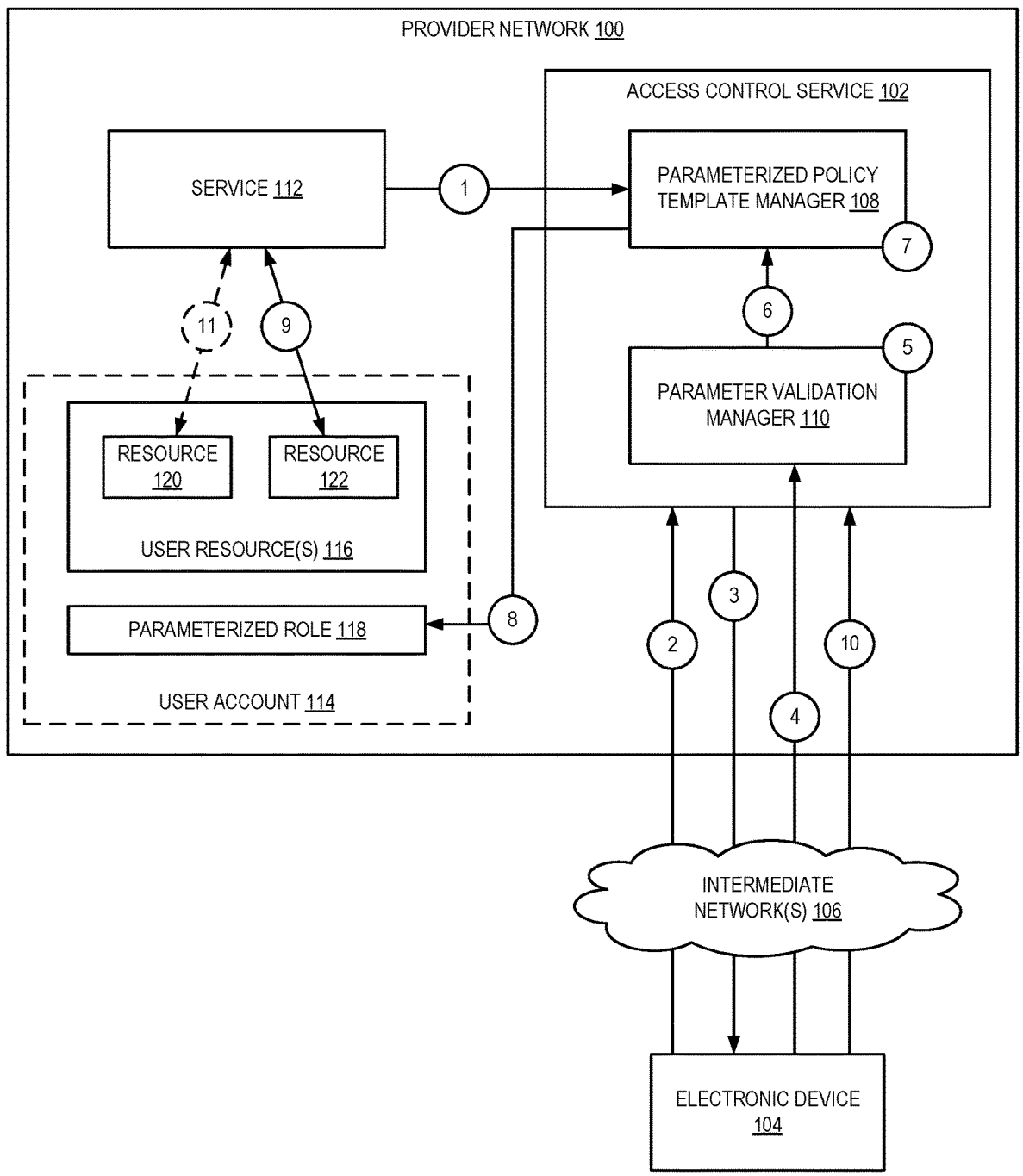
FIG. 1 is a diagram illustrating an environment for parameterized trust and permission policies between entities for cloud resources according to some embodiments.

The present disclosure relates to methods, apparatus, systems, and non-transitory computer-readable storage media for parameterized trust and permission policies between entities for cloud resources. According to some embodiments, a pre-defined permission policy can be parameterized, called a Parameterized Service-Linked Role (PSLR). For example, a service can define a permission policy that allows it to perform one or more actions (such as calling a set of APIs) on a type of user resource. The user can then provide a list of those resources based on the PSLR. For example, the list of resources can be validated against the requirements for the resource(s) specified in the PSLR. This may include the type of resource, number of resources, location of the resource, etc. Similarly, in some embodiments, a service can define a permission policy that allowed it to perform one or more actions on a type of user resource where the actions to be performed can be provided by the user as a list of actions. These actions may also be validated against the requirements specified in the PSLR. Once the user has provided the required action and/or resource information, a permission policy can be generated granting the service permission to perform the action(s) on the user specified resource.

As discussed, service-linked roles provide a mechanism by which a service can define a policy which allows the service to perform particular actions on a user's resources. Traditionally, the SLR is defined entirely by the service to be applied to multiple different users. This has the benefit of being service-defined, enabling the service to specify the access it needs in order to provide its services to the user, without risking the introduction of errors where each user must specify their own policy. However, as a result an SLR is user-generic because the service has no way of knowing the specific resources a user actually has. This means that SLRs are defined over-permissively. For example, if a service needs to be able to write data to a user-owned data storage location managed by a data storage service, the SLR has to be defined to enable access to all storage locations owned by the user managed by that data storage service. This is because each data storage location for each user is unique, with a different name or identifier, uniform resource locator (URL) address, etc., and the service has no visibility into each user's specific resources. This is not ideal for either the service or the user, as it presents a security risk for the user and the service would prefer to have the least amount of access to the user's resources necessary to provide its services to the user.

Embodiments address these issues by creating PSLRs. The PSLRs have the benefits of the SLRs (e.g., they are service-defined, which prevents the introduction of errors by the user in user-defined policies) while allowing the user to specify the actions and/or resources to which the policy applies, limiting the scope of the access to the service to only those actions and/or user resources needed to perform its services.

FIG. 1 is a diagram illustrating an environment for parameterized trust and permission policies between entities for cloud resources according to some embodiments. The exemplary environment includes a provider network 100. A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

The provider network includes an access control service (ACS) 102, which includes a parameterized policy template manager 108 through which an entity such as a user or service can define a Parameterized Service-Linked Role (PSLR). The ACS 102 can be one or more software applications or programs executed by the processors of one or more computer systems of the provider network 100. Likewise, the parameterized policy template manager 108 can be one or more software applications or programs executed by the processors of one or more computer systems of the provider network 100.

The ACS 102 can provide identity and access management (IAM) for the provider network 100 such as through ACS frontend components that authenticate users and manage sessions with resources of the provider network or ACS backend components that provide session-specific information to other components of the provider network. For example, a user can authenticate with the provider network 100 through the ACS 102 via an interface (not shown) such as an SSH-command-line interface, a console implemented as a website or application, an application programming interface (API), etc. The ACS 102 can also control access to particular resources of the provider network. For example, the ACS 102 can control access to various virtualized data stores provided by a storage service of the provider network. In some embodiments, one or more resource interfaces may be implemented that manage specific access requests for resources and communicate with the ACS 102 to ensure the requestor is authorized to access the requested resource. For example, a resource interface to a storage service can control access to various virtualized data stores of the provider network 100 while a resource interface to a hardware virtualization service of the provider network 100 can control access to various virtualized compute instances of the provider network 100.

As shown in FIG. 1, a service 112 of provider network 100 can define a Parameterized Service-Linked Role (PSLR) via a parameterized policy template manager 108 of an access control service 102, at numeral 1. For example, the PSLR defined by the service 112 may allow the service 112 to write to one or more storage locations owned by a user. The specific storage locations that are to be written to are defined as parameters that the user is to provide and/or modify, but otherwise the PSLR is not modifiable by the user. For example, at numeral 2, the user can send a request to provider network 100 for one or more services provided by service 112. In response, at numeral 3, the ACS 102 can notify the user that one or more parameters need to be provided to create the PSLR to enable the service. The notification at numeral 3 can identify details regarding the parameters that need to be provided. For example, it may indicate that one or more actions need to be selected and/or that one or more resources need to be identified. Further, it may indicate the type of resources that need to be identified. For example, storage locations in a storage service, containers of a container service, instances of a hardware virtualization service, etc.

At numeral 4, the user can provide the parameterized list. As shown, this can be received by a parameter validation manager 110. At numeral 5, the parameter validation manager can identify the parameters specified by the user and validate that they conform with the requirements of the PSLR. This may include querying the specified resources to ensure they are of the correct type, determining that a correct number of resources or actions have been provided, etc. Once verified, at numeral 6 the parameter lists can be passed to the parameterized policy template manager 108 and used to generate a parameterized role, at numeral 7. At numeral 8, the parameterized role 118 can be added to the user account 114.

As shown in FIG. 1, the user account 114 can include the parameterized role 118 and one or more user resources 116, such as resource 120 and 122. As discussed, the user resources 116 may include various resources made available by provider network 100, such as storage locations of a storage service, containers of a container service, instances of a hardware virtualization service, user data, virtual network components, etc. Once the parameterized role has been added to the user account, the service linked to the parameterized role can then access the user resources 116 according to the parameterized role, For example, as shown at numeral 9, the service can access resource 122 but not resource 120 to perform one or more actions based on the parameterized role.

Subsequently, at numeral 10, the user can choose to update the parameterized list. For example, the user can remove resource 122 from the parameterized list and add a new resource (e.g., resource 120 or other resource). The user can provide an updated parameterized list at numeral 10 to the ACS which indicates the resource change (e.g., the updated parameterized list includes resource 120 and does not include resource 122). The parameterized policy template manager 108 can validate the updated parameterized resource list as discussed above with respect to numeral 5. Likewise, at numeral 6, the updated parameterized list, once validated, can be provided to parameterized policy template manager which can generate an updated parameterized role based on the updated parameterized list. At numeral 8, the updated parameterized role can be added to the user's account. In some embodiments, the existing parameterized role can be updated by the parameterized policy template manager. Alternatively, the existing parameterized role can be deleted by the parameterized policy template manager and a new parameterized role can be added to the user account. Once updated, the service 112 now has access to the user's resources based on the updated parameterized role. For example, if the user removes access to resource 122 without adding any additional resource, then the service 112 will no longer have access to resource 122. If the user removes access to resource 122 and adds resource 120, then at numeral 11, the service 112 now has access to resource 120. The user may additionally, or alternatively, choose similarly to update the actions that are allowed to be performed on their resources by the service by updating a parameterized action list associated with the parameterized policy template. In some embodiments, the user can add or remove resources and/or actions at their discretion. Because the PSLR is defined and owned by the service 112, the user cannot accidentally give the service access to anything more than the permissions defined in the PSLR.

In some embodiments, once a template has been created it can be associated with a template identifier. The template identifier can be included with subsequent requests by a user to add an associated parameterized role to their account. In some embodiments, ACS 102 can provide auditing services which enable a user to determine all roles that have been added to their account associated with a particular service.

Figure 2:
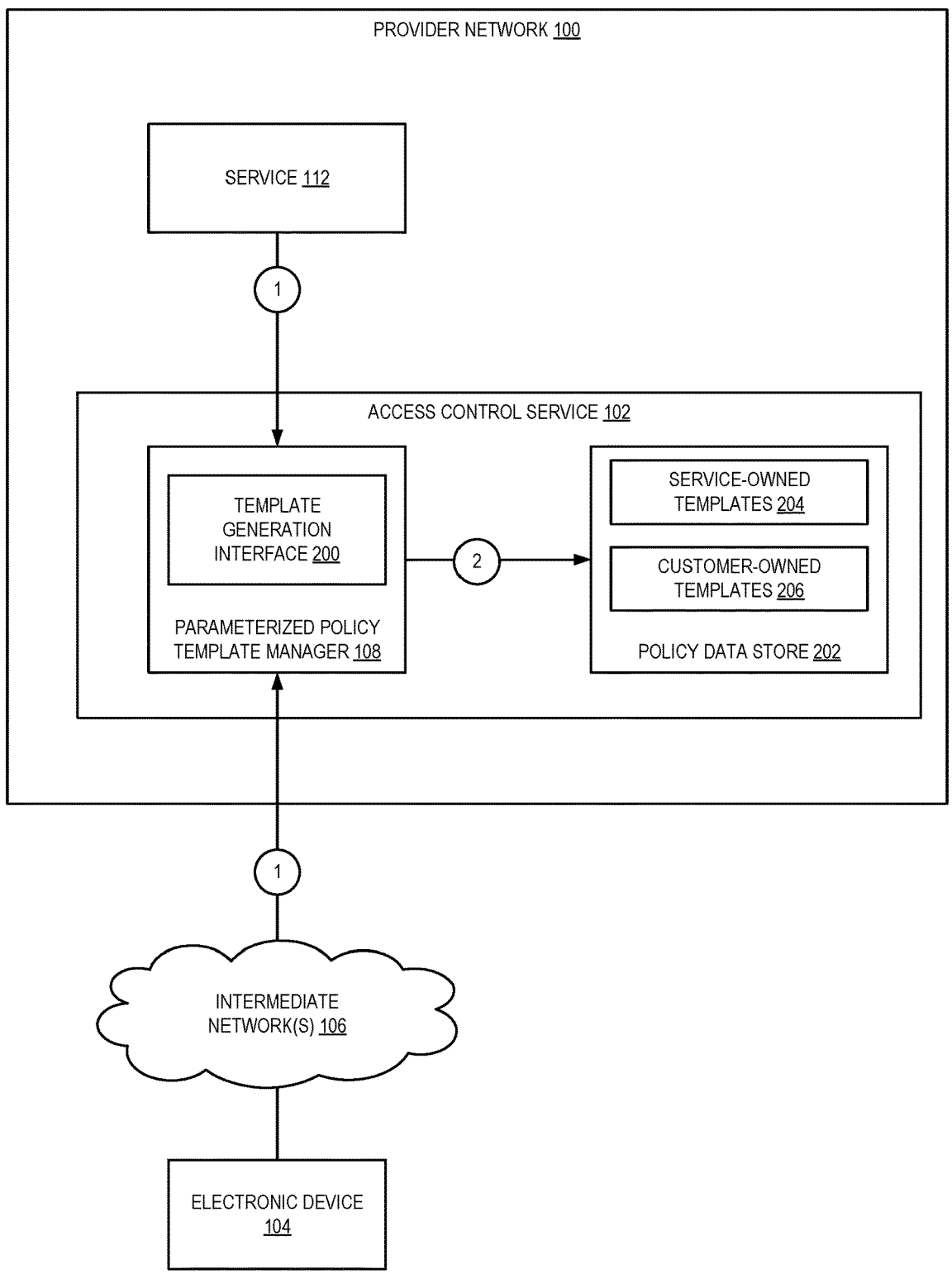
FIG. 2 is a diagram illustrating an environment for generating parameterized trust and permission policies between entities for cloud resources according to some embodiments.

FIG. 2 is a diagram illustrating an environment for generating parameterized trust and permission policies between entities for cloud resources according to some embodiments. As shown in FIG. 2, a service or user can create a PSLR by communicating with the parameterized policy template manager 108, as shown at numeral 1. In some embodiments, parameterized policy template manager 108 can include template generation interface 200. Template generation interface 200 can include an SSH-command-line interface, a console implemented as a website or application, an application programming interface (API), etc. In some embodiments, the service 112 or user of electronic device 104 can provide policy details to the template generation interface 200. The policy details may include a policy written in JSON or other suitable format which includes annotations that identify the portions of the policy that are parameterized as well as the characteristics of the parameterized list that is to be provided (e.g., resource type, number of resources, acceptable actions, etc.). In some embodiments, template generation interface 200 may include a "wizard" or other graphical user interface which enables the user or service to construct the policy. For example, the user or service may walk through a series of steps presented by the template generation interface 200 to identify the particular actions that are to be performed on particular resources and identify the portions of the policy that are to be parameterized along with the characteristics of those parameters.

At numeral 2, once the parameterized policy template has been defined, it can be stored in policy data store 202. In some embodiments, policy data store may be implemented as part of a storage service, such as an object storage service, database storage service, etc. The ACS 102 can maintain both service-owned templates 204 and user-owned templates 206. In various embodiments, the ACS 102 can maintain each service's templates isolated from one another and may likewise maintain each user's template isolated from one another. Each template can be indexed based on an identifier and/or based on the service or user with which it is associated. In some embodiments, when another user or service requests access to a service, joins a user's organization, etc. they can be requested to provide a parameterized list for the PSLR associated with that service or user from the policy data store and the appropriate parameterized role can then be generated as discussed with respect at least to FIG. 1.

Figure 3:
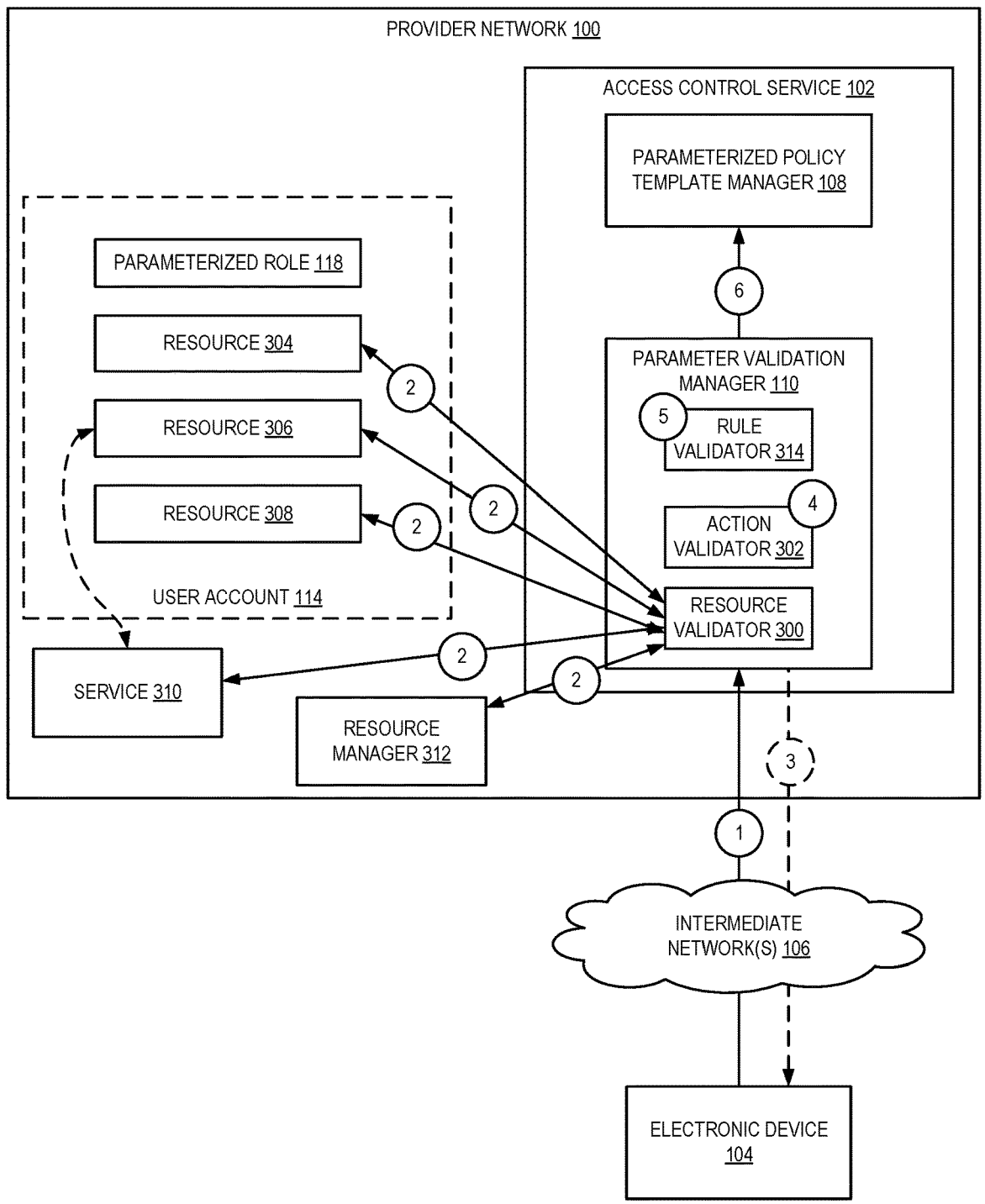
FIG. 3 is a diagram illustrating an environment for validating parameterized trust and permission policies between entities for cloud resources according to some embodiments.

FIG. 3 is a diagram illustrating an environment for validating parameterized trust and permission policies between entities for cloud resources according to some embodiments. As shown in FIG. 3, at numeral 1 a user can provide a parameterized list to parameter validation manager 110. As shown, in some embodiments, parameter validation manager 110 can include a resource validator 300 and an action validator 302. At numeral 2, if the parameterized list is a list of resources, then the resource validator 300 can query the resources 304-308 to determine their resource type. For example, the parameterized list may include resource identifiers that are assigned by the provider network 100 when a resource is created. Using the resource identifiers, a message can be sent to the resource requesting details about the resource. Each resource can return a response that indicates resource type, resource location, resource IP address, resource owner, etc. Additionally, or alternatively, the resource validator may query a service 310 associated with the customer's resource. For example, service 310 may be a storage service which provides a storage location owned by the user and represented by resource 306. The resource validator can query the service 310 which provides the user's resource to obtain the details of the resource, such as resource type, resource location, resource IP address, resource owner, etc. In some embodiments, a resource manager 312 may maintain resource metadata for resources provided by one or more services. The resource manager 312 can be queried by the resource validator to obtain the resource details.

The resource validator 300 can compare the resource details returned to the parameterized policy template associated with the request received at numeral 1. For example, the parameterized policy template may require that a resource be located in a particular area or region of provider network 100. The parameterized policy template may additionally, or alternatively, require that a resource be owned by the customer. The parameterized policy template may additionally, or alternatively, require that the resource be of a type defined by the parameterized policy template. Additional or alternative requirements may be placed on the resources to be specified by the user based on the parameterized policy template, for example the parameterized list may be required to include a particular number of resources (e.g., a minimum and/or maximum number). In the example of FIG. 3, if a resource is determined not to comply with the resource requirements of the parameterized policy template and, at numeral 3, an error message can be returned to the user. The error message may request that the user provide an updated parameterized list and/or may indicate why the resource could not be validated.

If the parameterized list is a list of actions, then action validator 302 can validate the provided actions at numeral 4. Actions may include, e.g., read access, write access, delete access, etc. The Action validator 302 can compare the actions included in the parameterized list received at 1 and confirm that they belong to the available actions defined by the parameterized policy template. If the actions do not match, an error message can be returned to the user at numeral 3. Some parameterized policy templates may require a parameterized list of resources, a parameterized list of actions, or both. As such, for a given request, resource validator 300 and/or action validator 302 may be called to validate the parameterized list received at numeral 1.

In some embodiments, the parameterized policy template may additionally or alternatively define a number of rules. Rule validator 314 can apply the rules to the parameterized list of actions or resources at numeral 5. For example, the rules may define the number of resources or actions, location of resources, or more fine-grained rules such as a rule defining that if a first parameter is defined then a second parameter cannot be defined, or if a first resource is in a first area of provider network 100 then a second resource must be in the same or different area of the provider network, etc.

Once validated by the appropriate validators, at numeral 6, the parameterized list or lists can be provided to parameterized policy template manager 108 to generate the corresponding parameterized role as discussed herein.

Figure 4:
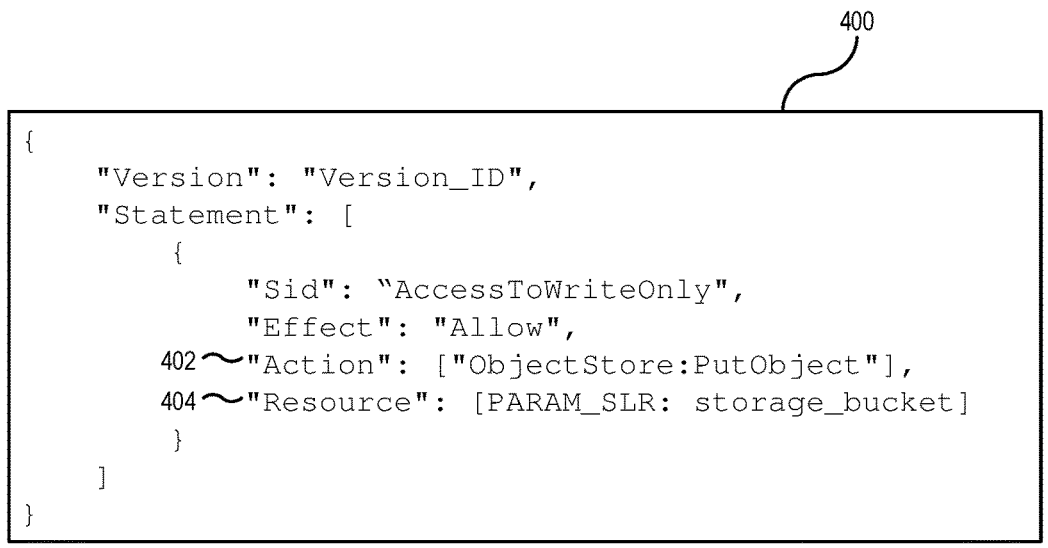
FIG. 4 is a diagram illustrating example parameterized policy templates according to some embodiments.
Figure 4:
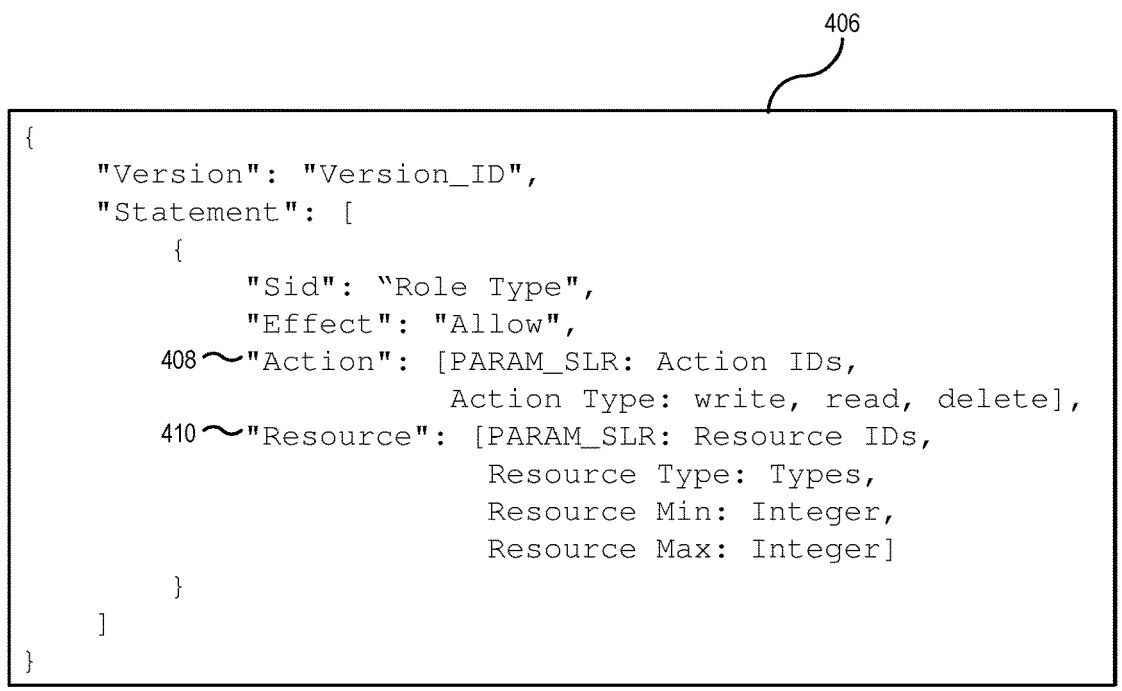

FIG. 4 is a diagram illustrating example parameterized policy templates according to some embodiments. As shown in FIG. 4, an example parameterized policy template 400 may specify an action 402 and a parameterized list of resources 404 to be provided. In this example, the action is specified as a PutObject action (e.g., write action) in an object storage service and the resource 404 is specified as a "PARAM_SLR" (e.g., a parameterized list annotation) of type "storage_bucket" (e.g., indicating that the user is to provide a parameterized list of storage locations in the object storage service). Similarly, example parameterized policy template 406 specifies an action 408 and a parameterized list of resources 410 to be provided. The action 408 is annotated to indicate that a parameterized list of actions is to be provided (e.g., by providing action identifiers, such as API calls) and that these actions are to be of type write, read, or delete. The resources 410 are also annotated to indicate that the user is to provide a parameterized list of resource identifiers that are to be of type "Types" and that the user is to provide at least a minimum number of resource identifiers up to a maximum number of resource identifiers. The examples of FIG. 4 are for illustration purposes and are not intended to be limiting. Various parameterized lists and resource/action characteristics may be implemented using the parameterized policy templates described herein.

Figure 5:
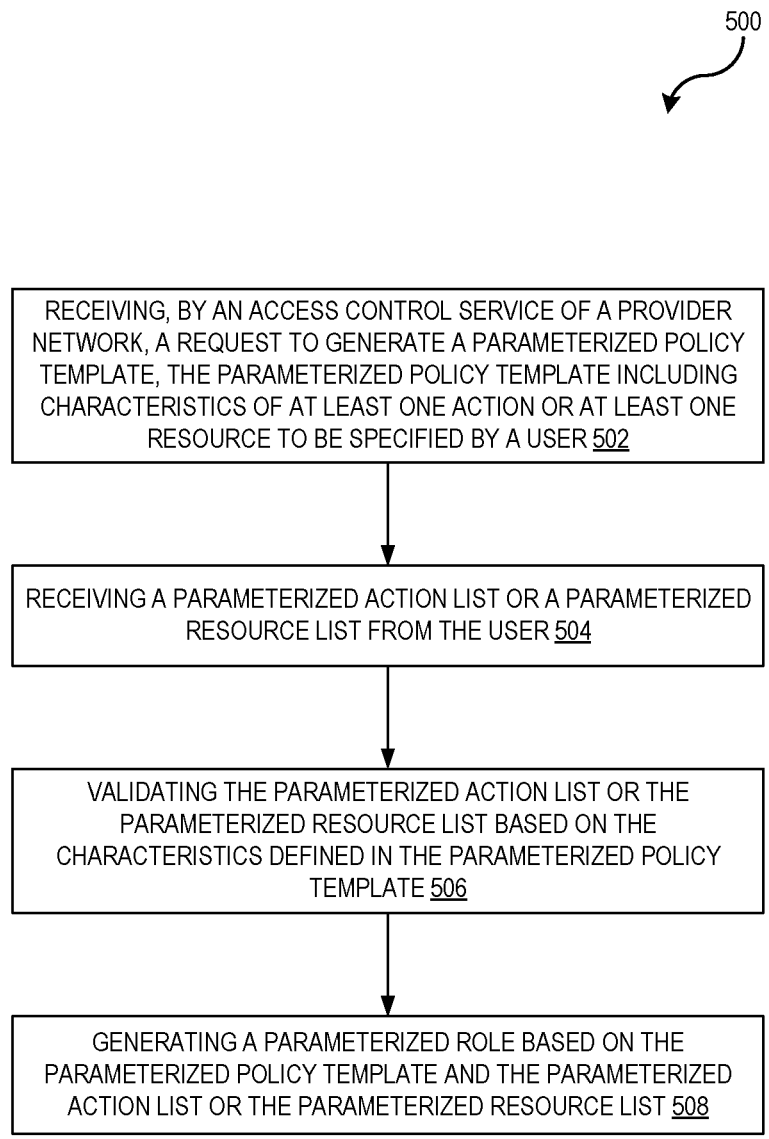
FIG. 5 is a flow diagram illustrating operations of a method for parameterized trust and permission policies between entities for cloud resources according to some embodiments.

FIG. 5 is a flow diagram illustrating operations of a method for parameterized trust and permission policies between entities for cloud resources according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by access control service 102 of the other figures.

The operations 500 include, at block 502, receiving, by an access control service of a provider network, a request to generate a parameterized policy template, the parameterized policy template including characteristics of at least one action or at least one resource to be specified by a user.

The operations 500 further include, at block 504, receiving a parameterized action list or a parameterized resource list from the user. In some embodiments, the parameterized resource list can identify resources specified by the user by resource identifier which a service is authorized to access. In some embodiments, each resource in the parameterized resource list is a storage location of the storage service owned by the user. In some embodiments, the parameterized action list may include one or more actions, specified by the user, which the service is authorized to perform on the user's resources.

The operations 500 further include, at block 506, validating the parameterized action list or the parameterized resource list based on the characteristics defined in the parameterized policy template. In some embodiments, validating may include determining a resource type associated with each resource in the parameterized resource list, and comparing the resource type associated with each resource in the parameterized list to a resource type specified in the parameterized policy template. In some embodiments, determining a resource type may include querying each resource to obtain resource characteristics, the resource characteristics including one or more of the resource type, resource owner, resource location.

In some embodiments, validating the parameterized action list or the parameterized resource list may further include determining a number of resources in the parameterized resource list, and comparing it to a quantitative resource characteristic specified in the parameterized policy template. In some embodiments, validating the parameterized action list or the parameterized resource list may further include determining an area of the provider network associated with each resource in the parameterized resource list, and comparing it to a quantitative resource characteristic specified in the parameterized policy template. In some embodiments, validating the parameterized action list or the parameterized resource list may further include determining an action type associated with each action in the parameterized action list and comparing it to an action type specified in the parameterized policy template. In some embodiments, validating the parameterized action list or the parameterized resource list may further include determining a resource characteristic associated with a first resource in the parameterized resource list does not match a resource characteristic specified in the parameterized policy template and returning an error indicating the first resource does not match the resource characteristic specified in the parameterized policy template.

The operations 500 further include, at block 508, generating a parameterized role based on the parameterized policy template and the parameterized action list or the parameterized resource list. In some embodiments, the operations may further include receiving an updated parameterized resource list, determining a resource type associated with the first resource in the updated parameterized resource list does match the resource type specified in the parameterized policy template, and updating the parameterized role based on the updated parameterized resource list. In some embodiments, the operations may further include adding the parameterized role to the user account.

In some embodiments, the operations include receiving a request to generate a parameterized policy template, the request specifying an action to be allowed to be performed by a service on a customer's resource in a provider network, wherein characteristics associated with the customer's resource to be specified by the customer is defined in the parameterized policy template, receiving a request to add a parameterized role associated with the parameterized policy template to a customer account, sending a request to a customer associated with the customer account to provide identifiers associated with one or more resources, receiving a parameterized resource list including the one or more resources, validating the one or more resources in the parameterized resource list, generating the parameterized role based on the parameterized policy template and the one or more resources, and adding the parameterized role to the customer account.

In some embodiments, the parameterized resource list is further associated with a quantity of resources to be provided by the customer. In some embodiments, the request to generate the parameterized policy template specifies a parameterized action list including the action and one or more additional actions.

In some embodiments, the operations include receiving, by an access control service of a provider network, a request to update a parameterized list associated with a parameterized role based on a parameterized policy template, the request including an updated parameterized list, validating the updated parameterized list based on characteristics defined in the parameterized policy template, and updating an existing parameterized role based on the parameterized policy template and the updated parameterized list. In some embodiments, the updated parameterized list includes at least one change to a parameterized action list or a parameterized resource list.

In some embodiments, updating an existing parameterized role based on the parameterized policy template and the updated parameterized list may include deleting the existing parameterized role from a user's account in the provider network, and adding a new parameterized role generated based on the updated parameterized list to the user's account. In some embodiments, updating an existing parameterized role based on the parameterized policy template and the updated parameterized list, may include changing at least one resource or action in the existing parameterized role based on the updated parameterized list.

Figure 6:
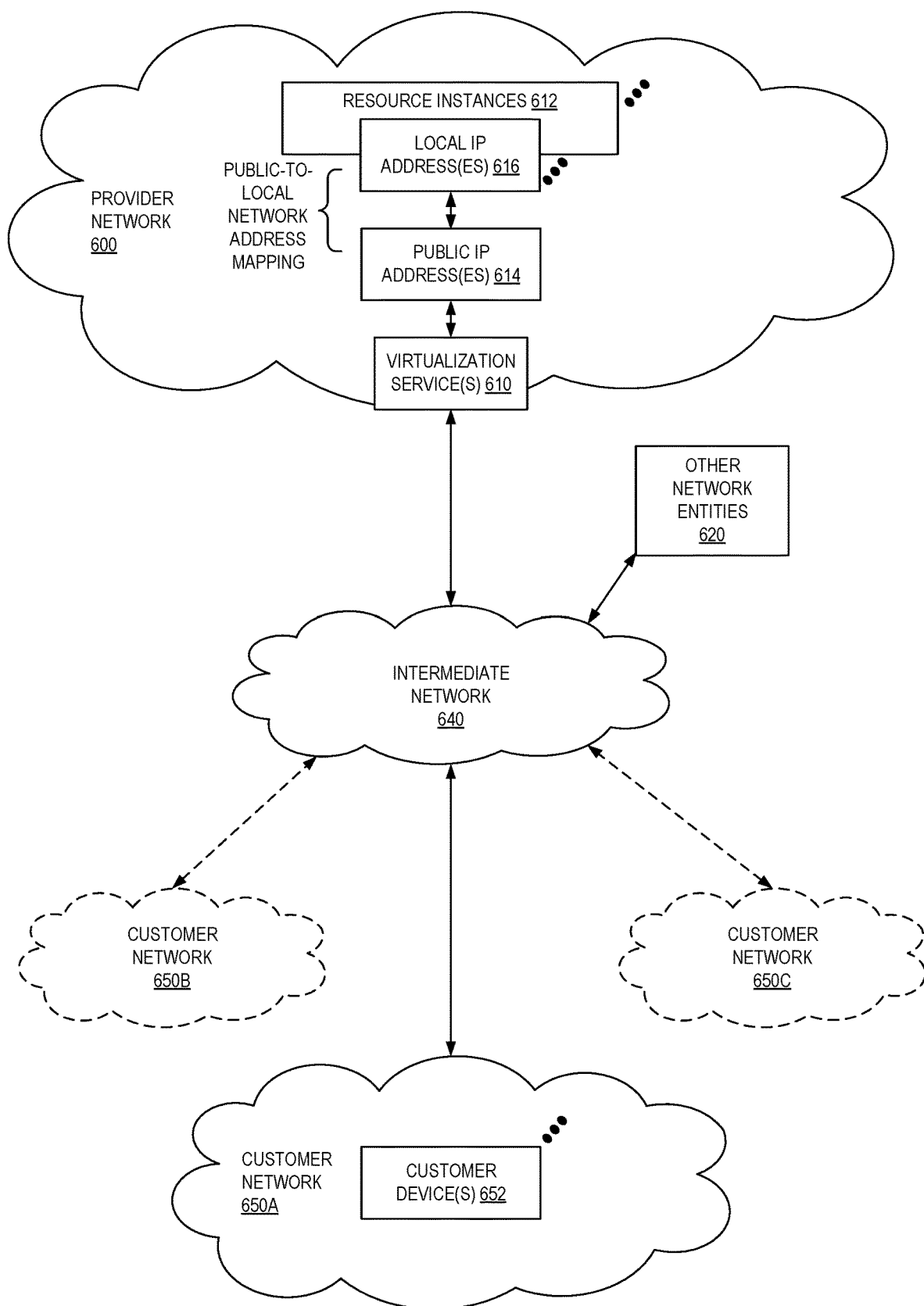
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
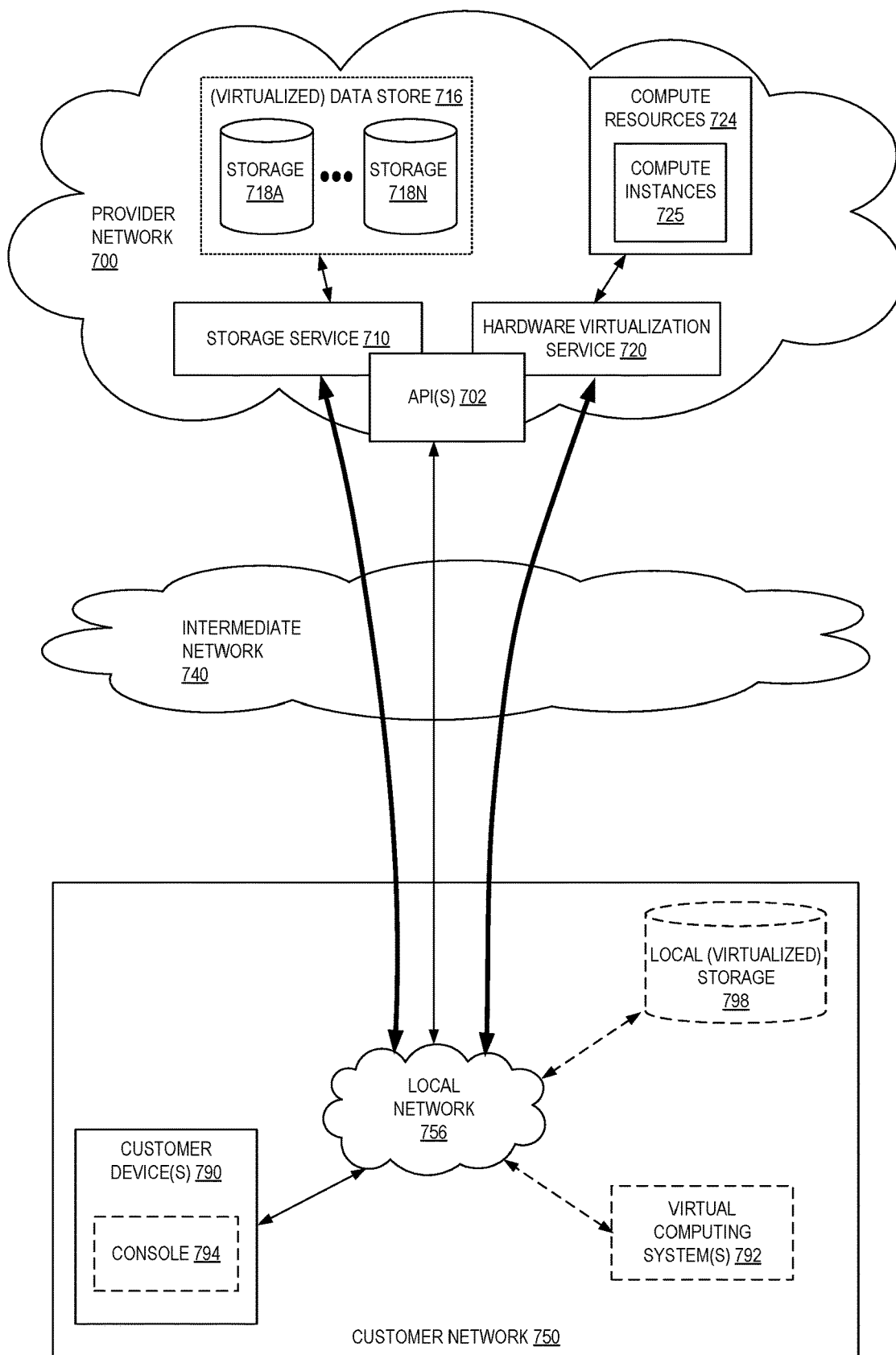
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple compute resources 724 (e.g., compute instances 725 such as VMs) to customers. The compute resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the compute resources 724 to public Internet destinations, and from public Internet sources to the local IP addresses of compute resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative Systems

Figure 8:
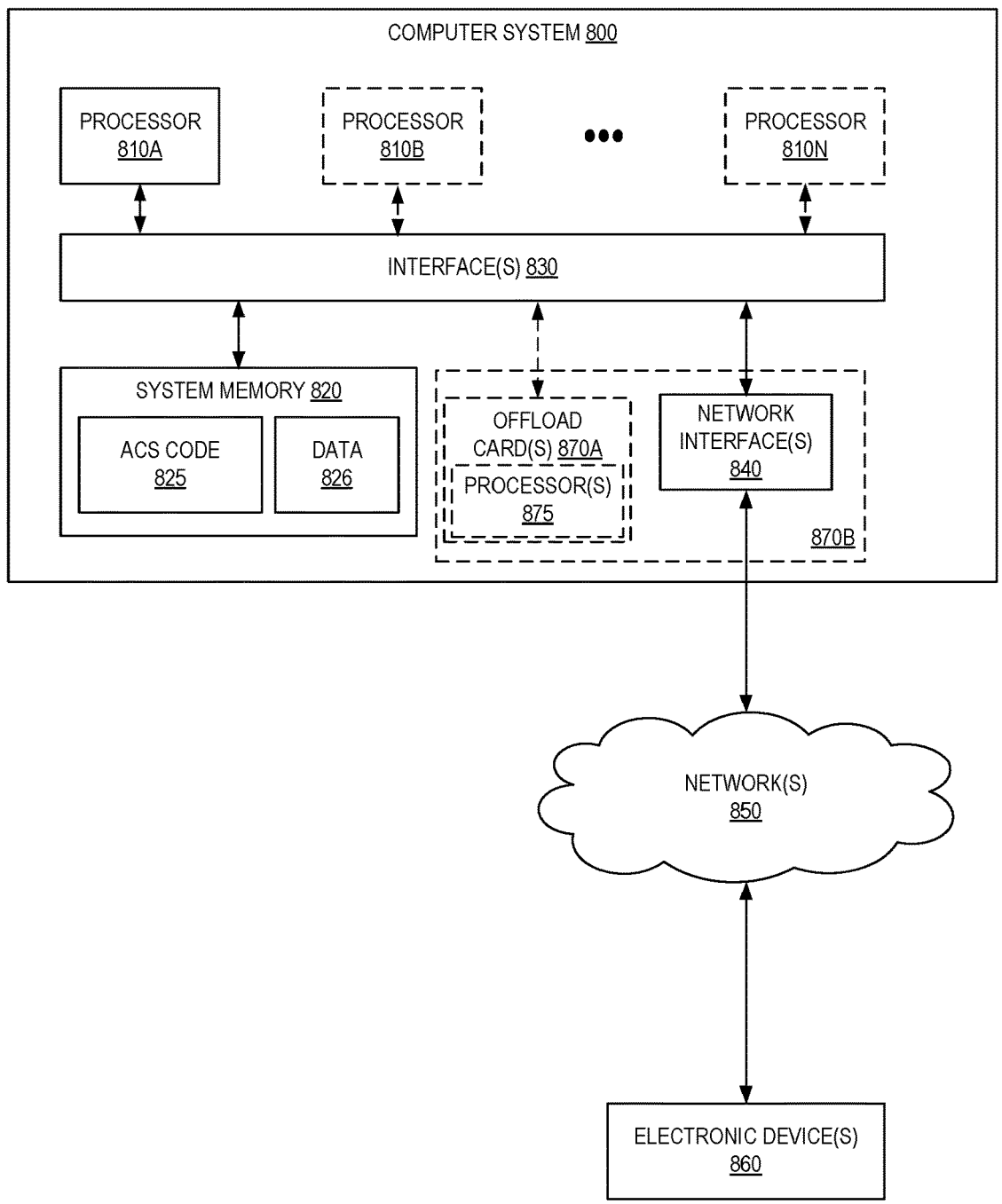
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as access control service code 825 (e.g., executable to implement, in whole or in part, the access control service 102) and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870A or 870B (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some embodiments the offload card(s) 870A or 870B can perform compute instance management operations such as pausing and/or un-pausing compute instances, launching and/or terminating compute instances, performing memory transfer/copying operations, etc. These management operations may, in some embodiments, be performed by the offload card(s) 870A or 870B in coordination with a hypervisor (e.g., upon a request from a hypervisor) that is executed by the other processors 810A-810N of the computer system 800. However, in some embodiments the virtualization manager implemented by the offload card(s) 870A or 870B can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C #or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving a request to generate a parameterized policy template, the request specifying an action to be allowed to be performed by a service on a customer's resource in a provider network, wherein characteristics associated with the customer's resource to be specified by the customer is defined in the parameterized policy template;
receiving a request to add a parameterized role associated with the parameterized policy template to a customer account;
sending a request to a customer associated with the customer account to provide identifiers associated with one or more resources;
receiving a parameterized resource list including the one or more resources;
validating the one or more resources in the parameterized resource list;
generating the parameterized role based on the parameterized policy template and the one or more resources; and
adding the parameterized role to the customer account.

2. The computer-implemented method of claim 1, wherein the parameterized resource list is further associated with a quantity of resources to be provided by the customer.

3. The computer-implemented method of claim 1, wherein the request to generate the parameterized policy template specifies a parameterized action list including the action and one or more additional actions.

4. A computer-implemented method comprising:
receiving, by an access control service of a provider network, a request to generate a parameterized policy template, the parameterized policy template including characteristics of at least one action or at least one resource to be specified by a user;
receiving a parameterized action list or a parameterized resource list from the user;
validating the parameterized action list or the parameterized resource list based on the characteristics defined in the parameterized policy template; and
generating a parameterized role based on the parameterized policy template and the parameterized action list or the parameterized resource list.

5. The computer-implemented method of claim 4, wherein validating the parameterized action list or the parameterized resource based on the characteristics defined in the parameterized policy template, further comprises:
determining a resource type associated with each resource in the parameterized resource list; and
comparing the resource type associated with each resource in the parameterized list to a resource type specified in the parameterized policy template.

6. The computer-implemented method of claim 5, wherein determining a resource type associated with each resource in the parameterized resource list, further comprises:
querying each resource to obtain resource characteristics, the resource characteristics including one or more of the resource type, resource owner, resource location.

7. The computer-implemented method of claim 4, wherein validating the parameterized action list or the parameterized resource based on the characteristics defined in the parameterized policy template, further comprises:
determining a number of resources in the parameterized resource list; and
comparing it to a quantitative resource characteristic specified in the parameterized policy template.

8. The computer-implemented method of claim 4, wherein validating the parameterized action list or the parameterized resource based on the characteristics defined in the parameterized policy template, further comprises:
determining an area of the provider network associated with each resource in the parameterized resource list; and
comparing it to a quantitative resource characteristic specified in the parameterized policy template.

9. The computer-implemented method of claim 4, wherein validating the parameterized action list or the parameterized resource based on the characteristics defined in the parameterized policy template, further comprises:
determining an action type associated with each action in the parameterized action list; and
comparing it to an action type specified in the parameterized policy template.

10. The computer-implemented method of claim 4, wherein validating the parameterized action list or the parameterized resource based on the characteristics defined in the parameterized policy template, further comprises:
determining a resource characteristic associated with a first resource in the parameterized resource list does not match a resource characteristic specified in the parameterized policy template; and
returning an error indicating the first resource does not match the resource characteristic specified in the parameterized policy template.

11. The computer-implemented method of claim 10, further comprising:
receiving an updated parameterized resource list;
determining a resource characteristic associated with the first resource in the updated parameterized resource list does match the resource type specified in the parameterized policy template; and
updating the parameterized role based on the updated parameterized resource list.

12. The computer-implemented method of claim 4, further comprising:
adding the parameterized role to the user account.

13. A system comprising:
a first one or more electronic devices to implement a storage service in a multi-tenant provider network; and
a second one or more electronic devices to implement an access control service (ACS) in the multi-tenant provider network, the ACS including instructions that upon execution cause the ACS to:
receive a request to generate a parameterized policy template, the parameterized policy template including characteristics of at least one action or at least one resource associated with the storage service to be specified by a user;
receive a parameterized action list or a parameterized resource list from the user;

validate the parameterized action list or the parameterized resource list based on the characteristics defined in the parameterized policy template; and generate a parameterized role based on the parameterized policy template and the parameterized action list or the parameterized resource list.

14. The system of claim 13, wherein to validate the parameterized action list or the parameterized resource based on the characteristics defined in the parameterized policy template, the instructions, when executed, further cause the ACS to:

determine a resource type associated with each resource in the parameterized resource list; and compare the resource type associated with each resource in the parameterized list to a resource type specified in the parameterized policy template.

15. The system of claim 14, wherein to determine a resource type associated with each resource in the parameterized resource list, the instructions, when executed, further cause the ACS to:

query each resource to obtain resource characteristics, the resource characteristics including one or more of the resource type, resource owner, resource location.

16. The system of claim 15, wherein each resource in the parameterized resource list is a storage location of the storage service owned by the user.

17. The system of claim 13, wherein to validate the parameterized action list or the parameterized resource based on the characteristics defined in the parameterized policy template, the instructions, when executed, further cause the ACS to:

determine a number of resources in the parameterized resource list; and compare it to a quantitative resource characteristic specified in the parameterized policy template.

18. The system of claim 13, wherein to validate the parameterized action list or the parameterized resource based on the characteristics defined in the parameterized policy template, the instructions, when executed, further cause the ACS to:

determine an area of the provider network associated with each resource in the parameterized resource list; and compare it to a quantitative resource characteristic specified in the parameterized policy template.

19. The system of claim 13, wherein to validate the parameterized action list or the parameterized resource based on the characteristics defined in the parameterized policy template, the instructions, when executed, further cause the ACS to:

determine an action type associated with each action in the parameterized action list; and compare it to an action type specified in the parameterized policy template.

20. The system of claim 13, wherein to validate the parameterized action list or the parameterized resource based on the characteristics defined in the parameterized policy template, the instructions, when executed, further cause the ACS to:

determine a resource characteristic associated with a first resource in the parameterized resource list does not match a resource characteristic specified in the parameterized policy template; and return an error indicating the first resource does not match the resource characteristic specified in the parameterized policy template.

21. A computer-implemented method comprising:

receiving, by an access control service of a provider network, a request to update a parameterized list associated with a parameterized role based on a parameterized policy template, the request including an updated parameterized list;

validating the updated parameterized list based on characteristics defined in the parameterized policy template; and updating an existing parameterized role based on the parameterized policy template and the updated parameterized list.

22. The computer-implemented method of claim 21, wherein the updated parameterized list includes at least one change to a parameterized action list or a parameterized resource list.

23. The computer-implemented method of claim 21, wherein updating an existing parameterized role based on the parameterized policy template and the updated parameterized list, further comprises:

deleting the existing parameterized role from a user's account in the provider network; and adding a new parameterized role generated based on the updated parameterized list to the user's account.

24. The computer-implemented method of claim 21, wherein updating an existing parameterized role based on the parameterized policy template and the updated parameterized list, further comprises:

changing at least one resource or action in the existing parameterized role based on the updated parameterized list.

* * * * *